United States Patent [19]

Niebylski

[11] Patent Number: 5,208,284

[45] Date of Patent: May 4, 1993

[54] COATING COMPOSITION

[75] Inventor: Leonard M. Niebylski, Birmingham, Mich.

[73] Assignee: Ethyl Corporation, Richmond, Va.

[21] Appl. No.: 446,184

[22] Filed: Dec. 5, 1989

[51] Int. Cl.⁵ .................. C08G 77/04; C08G 77/26
[52] U.S. Cl. .................. 524/382; 524/394; 524/398; 524/399; 524/439; 524/492; 106/287.11
[58] Field of Search ............ 524/382, 394, 398, 399, 524/439, 492; 106/287.11

[56] References Cited

U.S. PATENT DOCUMENTS 4,808,653  2/1989  Haluska et al. .................. 524/394
4,835,207  5/1989  Semen et al. .................. 106/287.11

Primary Examiner—Robert L. Stoll
Assistant Examiner—Gary L. Geist
Attorney, Agent, or Firm—Patricia J. Hogan

[57] ABSTRACT

Coatings compositions, which are useful as buffer layers between ceramic layers derived from polysilazane-containing compositions and ceramic layers derived from organoborosilazane polymer-containing compositions, are obtained by dissolving (A) a Group IIIa metal hydrocarbyloxide, such as aluminum sec-butoxide, (B) a Group IVb metal hydrocarbyloxide, such as zirconium propoxide, (C) a bis-, tris-, or tetrakis(dialkylamino)-metal of Group IVb, such as tetrakis(diethylamino)-titanium, (D) a polysilazane and/or a bis-, tris-, or tetrakis(dialkylamino)silane, such as tetrakis(dimethylamino)silane, and (E) optionally also a cyclopentadienyl Group IVb metal halide, such as bis(cyclopentadienyl)zirconium dichloride, in an organic solvent, the amounts of ingredients A-D being such that each constitutes 1-50% of their combined weights, and the amount of ingredient E being such that it constitutes 0-20% of the combined weights of the ingredients.

15 Claims, No Drawings

COATING COMPOSITION

FIELD OF INVENTION

This invention relates to coating compositions and more particularly to coating compositions capable of acting as a buffer between ceramic layers derived from different preceramic materials.

BACKGROUND

As disclosed in copending applications Ser. No. 242,493 (Niebylski), filed Sep. 9, 1988 now U.S. Pat. No. 5,045,399; Ser. No. 261,104 (Niebylski) and Ser. No. 261,612 (Niebylski), both filed Oct. 24, 1988; and Ser. No. 272, 258 (Niebylski) now abandoned and Ser. No. 272,481 (Niebylski) now U.S. Pat. No. 4921, both filed Nov. 17, 1988, and Ser. No. 301,450, filed Jan. 25, 1989, now abandoned, normally oxidizable materials such as carbon/carbon composites can be protected from oxidative deterioration at elevated temperatures by the provision of ceramic coatings derived from polysilazne or organoborosilazane polymer compositions which may have ceramic or preceramic powders dispersed therein.

Copending application Ser. No. 301,449 (Niebylski), filed Jan. 25, 1989, now abandoned teaches that outstanding protection from oxidative deterioration at elevated temperatures can be obtained by the use of ceramic coatings having at least one layer derived from a polysilazane-containing composition and at least one layer derived from an organoborosilazane polymer-containing composition. However, it has been found that a disadvantage of at least some of these multi-layer coatings is that cracking is apt to occur when ceramic layers derived from polysilazine-containing compositions are applied over ceramic layers derived from organoborosilazane polymer-containing compositions.

SUMMARY OF INVENTION

An object of this invention is to provide novel coating compositions.

Another object is to provide such compositions which can be used as buffer layers between ceramic layers derived from polysilizane-containing compositions and ceramic layers derived from organoborosilazane polymer-containing compositions.

These and other objects are attained by dissolving (A) a Group IIIb metal hydrocarbyloxide, (B) a Group IVa metal hydrocarbyloxide, (C) a bis-, tris-, or tetrakis(dialkylamion)metal of Group IVa, (D) a polysilazane and/or a bis-, tris-, or tetrakis(dialkylamino)silane, and (E) optionally also a cyclopentadienyl Group IVa metal halide in an organic solvent; the amounts of ingredients A-D employed being such that each constitutes 1-50% of their combined weights, and the amount of ingredient E employed being such that it constitutes 0-20% of the combined weights of the ingredients.

DETAILED DESCRIPTION

The Group IIIb and Group IVa metal hydrocarbyloxides utilized in the practice of the invention may be any such compounds which can be dissolved in the organic solvent. Exemplary of such compounds are the aryloxides, such as the phenoxides; and the alkoxides, especially those in which the alkoxy groups contain 1-6 carbons, such as the methoxides, ethoxides, n- and isopropoxides, n-, sec-, and t-butoxides, pentoxides, and hexoxides, of boron, aluminum, gallium, indium, thallium, titanium, zirconium, and hafnium. The preferred Group IIIb metal hydrocarbyloxide is aluminum sec-butoxide, and the preferred Group IVa metal hydrocarbyloxide is zirconium propoxide. As indicated above, the amounts of Group IIIa metal hydrocarbyloxide and Group IVa metal hydrocarbyloxide used may vary widely. However, the preferred amount of each of these ingredients is about 20-30% of the combined weights of ingredients A-E.

The bis-, tris-, or tetrakis(dialkylamino)metal is a compound of a Group IVa metal, i.e., titanium, zirconium, or hafnium, in which the alkyl groups contain 1-6 carbons. Exemplary of such compounds are tetrakis(dimethylamino)titanium, tetrakis(dibutylamino)titanium, tetrakis(dipentylamino)titanium, tetrakis(dihexylamino)titanium, the corresponding tris(dialkylamino)titanium hydrides, the corresponding bis(dialkylamino)-titanium dihydrides, the corresponding zirconium and hafnium compounds, and mixtures thereof. The preferred compound is tetrakis(diethylamino)titanium, and the amount used is preferably about 1-15% of the combined weights of ingredients A-E.

The polysilazane which is sometimes used in the practice of the invention may be any polysilazane that is soluble in common organic solvents, such as aliphatic or aromatic hydrocarbons, dialkyl or alicyclic ethers, etc.; and it may be, e.g., a polysilazane of any of U.S. Pat. Nos. 4,397,828 (Seyferth et al.-I), 4,482,669 (Seyferth et al-II), 4,645,807 (Seyferth et al.-III), 4,650,837 (Seyferth et al.-IV), and 4,659,850 (Arai et al.), the teachings of all of which are incorporated herein in toto by reference. However, it is preferably a polysilazane of the type taught by Seyferth et al.-II, i.e., a silazane polymer prepared by reacting an organodihalosilane, such as methyldichlorosilane, with ammonia; treating the ammonolysis product with a basic catalyst, such as potassium hydride, which is capable of deprotonating an NH group that is adjacent to an SiH group; and quenching the resultant product with an electrophilic quenching reagent, such as methyl iodine or dimethylchlorosilane. Alternatively, it may be a mixture of such polysilazanes or an oligomeric ammonolysis product formed as an intermediate in the process of Seyferth et al.-II and isolated as in Seyferth et al.-I.

The bis-, tris-, or tetrakis(dialkylamino)silane which is used instead of or together with the polysilazane is a compound in which the alkyl groups contain 1-6 carbons. Exemplary of such compounds are tetrakis(dimethylamino)silane, tetrakis(diethylamino)silane, tetrakis(dipropylamino)silane, tetrakis(dibutylamino)silane, tetrakis(dipentylamino)silane, tetrakis(dihexylamino)silane, the corresponding tris- and bis(dialkylamino)silanes, and mixtures thereof. The preferred compound is tetrakis(dimethylamino)silane.

The amount of polysilazane and/or (dialkylamino)silane used is preferably about 20-30% of the combined weights of ingredients A-E.

The cyclopentadienyl Group IVa metal halide optionally employed is a compound corresponding to the formula $(C_5H_5)nMH_mX_p$ wherein M is a Group IVa metal, i.e., titanium, zirconium, or hafnium; X is halo, i.e., fluoro, chloro, bromo, or iodo; m is 0, 1, or 2; p and n are integers of 1-3; and the sum of m, n, and p is 4. Exemplary of such compounds are cyclopentadienylhafnium trichloride, bis(cyelopenstodienyl)hafnium dichloride, tris(cyclopentadienyl)hafnium chloride, cyclopentadienylhafnium chloride dihydride, bis(cyclopentadienyl)hafnium chloride hydride, the corresponding zirconium and titanium compounds, the corresponding fluorides, bromides, and iodides, and mixtures thereof. The preferred compound is bis(cyclopentadienyl)zirconium dichloride. When employed, this ingredient generally constitutes not more than about 5% of the combined weights of ingredients A-E.

The solvent employed for the composition may be any suitable organic solvent, such as hexane, heptane, and other aliphatic hydrocarbons; benzene, toluene, xylene, and other aromatic hydrocarbons; cyclohexanone, 1-methyl-2-pyrrolidone, and other ketones; 1,2-dimethoxyethane, 2-methoxyethyl ether, and other ethers; etc.; and mixture thereof. However, it is preferably xylene. Although the amount of solvent utilized is not critical, it is generally preferred to use an amount such as to provide a dissolved solids content of about 75-85% by weight.

It is sometimes desirable to disperse up to about 30% by weight of ceramic or preceramic powdered solids in the compositions of the invention in order to increase the use temperature of the composition, increase interlayer adhesion, and/or decrease large scale cracking. The preceramic powders that can be used include both those which undergo reaction to provide ceramics those which undergo reaction to provide glasses. Exemplary of the ceramic and preceramic powders are silicon metal; aluminumsilicon eutectic; silicon carbide; silicon nitride; metal borides, such as the borides of silicon, hafnium, titanium, niobium, zirconium, the rare earth metals, etc.; and mixtures of such powders, e.g., a mixture of silicon metal and silicon tetraboride in a weight ratio of about 3/1. When employed, the powders generally constitute about 15-30% by weight of the compositions.

As indicated above, the primary utility of the compositions of the invention is as buffer layers between ceramic layers derived from polysilazane-containing compositions and ceramic layers derived from organoborosilazane polymer-containing compositions, e.g., in the preparation of multilayer coatings on carbonaceous substrates, such as carbon/carbon composites, to protect the substrates from oxidative deterioration at elevated temperatures. When the compositions are to be used for this purpose, (1) the surfaces to be coated are generally cleaned and preferably also primed, (2) one or more layers of an polymer-containing composition are applied, dried, and pyrolyzed, (3) the buffer layer is applied, dried, and optionally also pyrolyzed, and (4) one or more layers of a polysilazane-containing composition are then applied, dried, and pyrolyzed.

When the substrate is carbonaceous, a particularly useful primer composition is one that comprises (1) about 99-95 parts by weight of a trialkoxy-, triaryloxy-, or tri(arylalkoxy)boroxine, (2) respectively about 1-5 parts by weight of an anhydrous acid selected from HF and HNO$_3$, (3) a non-aqueous vehicle for the acid, and (4) optionally a solvent for the boroxine. This composition may be applied to the substrate and solidified before any organoborosilazane polymer-containing composition is applied, or it may be incorporated into an organoborosilazane polymer-containing composition as the first coating applied to the substrate to be protected.

The boroxine component of the primer coating composition is preferably a trialkoxy-, triphenoxy-, tri(alkoxyphenoxy)-, tri(phenalkoxy)-, or tri(alkylphenalkoxy)boroxine in which any alkyl or alkoxy group contains 1-6 carbons, such as the trimethoxy-, triethoxy-, tripropoxy-, tributoxy-, tripentoxy-, trihexoxy-, triphenoxy-, tritolyloxy-, tri(2-ethylphenoxy)-, tributoxy)-, tri(5-phenylpentoxy)-, and tri(6-phenylhexoxy)boroxalkyl chains, tritolylethoxyboroxine, etc. It is most preferably xyboroxine.

The anhydrous acid, which is included in the primer to etch the surface of the substrate and thus improve adhesion of the coating, is preferably HF and is incorporated into the composition in any suitable non-aqueous vehicle, such as methanol, ethanol, isopropanol, pyridine, or other solvent. Because of their commercial availability, anhydrous HF-ethanol and HF-pyridine are apt to be preferred sources of the acid and When the boroxine is sufficiently low-melting, it is not necessary for the composition to contain a solvent for the boroxine. However, when the boroxine is too high-melting to be easily applied, and optionally even when the boroxine is low-melting, the composition usually contains a solvent for the e, etc.; an aromatic hydrocarbon, such as benzene, toluene, xylene, etc.; a non-hydrocarbon solvent, such as methanol, ethanol, cyclohexanone, 1-methylpyrrolidone, etc.; other solvents having boiling points not higher than about 250° C.; and mixtures of such solvents.

The primer composition may be applied to the substrate in any suitable manner, such as by dipping, spraying, swabbing, or brushing, to form a coating having the desired thickness, generally a thickness of about 0.5-15 micrometers. When the desired thickness has been deposited, the coating can then be solidified and adhered to the substrate by heating it at about 100°-250° C.

The organoborosilazane polymer-containing compositions which are applied over the primer coats or are combined with the primer ingredients are solutions of 5-75% by weight of an organoborosilazane polymer in 95-25% by weight of an organic solvent, the polymer being the reaction product obtained by mixing about 0.25-20 parts by weight of a trialkoxy-, triaryloxy-, or tri(arylalkoxy)boroxine (such as those described above) with a solution of one part by weight of a polysilazane in an organic solvent (such as those mentioned above) to initiate a exothermic reaction which results in the formation of the organoborosilazane polymer. The polysilazane used in this reaction may be any soluble polysilazane but is preferably a polysilazane of the type taught by Seyferth et al.-II. When the boroxine used to prepare the polymer is a trialkoxyboroxine, the weight ratio of boroxine to polysilazane in the reaction mixture is preferably about 1-6/1, most preferably about 3-4/1; and, when the boroxine is a triaryloxyboroxine, the weight ratio of boroxine to polysilazane is preferably about 1-10/1, most preferabl about 6-8/1.

In addition to the organoborosilazane polymer, solvent, and optional priming ingredients, these compositions may also fluoroborate, oxide, oxyfluoride, oxynitride, acetate, benzoate, etc., of beryllium, magnesium, calcium, strontium, barium, titanium, zirconium, or hafnium, or an organometallic compound of titanium, zirconium, or hafnium dispersed or solubilized therein Group IVa metal, it is preferably a cyclopentadienyl Group IVa metal halide, such as those which may be used in preparing the buffer compositions of the invention. These compositions are prepared by dispersing the salt or organometallic compound in the organoborosilazane polymer solution to provide about 0.1-1. part by weight of the salt or organometallic compound per part by weight of polysilazane used in preparing the organoborosilazan polymer and, if desired, then heating the dispersion to convert it to a solution.

Another ingredient which is sometimes desirably included is a polycarbosilane which is soluble in the solvent employed for the organoborosilazane polymer and which is used in an amount such as that in which the optional salt or compound is employed.

Alternatively or additionally, the organoborosilazane polymer-containing compositions may contain up to about 30% by weight of ceramic or preceramic powders (such as those mentioned above) dispersed in the polymer solution.

The organoborosilazane polymer-containing compositions may be applied to the optionally primed substrate surfaces in any suitable manner, such as by spraying, swabbing, or brushing, to form coatings having the desired thickness, generally a thickness of up to about 1000 micrometers, frequently a thickness of about 10–250 micrometers. A coating of a desired thickness can be achieved by applying a single coating of that thickness or b applying the coating composition in multiple thinner layers. For example, when relatively thick coatings are desired, it is preferred to apply the coating composition in layers of about 25–100 micrometers, each layer being dried by driving off the solvent, and sometimes also pyrolyzed, before the next layer is applied.

When more than one layer of organoborosilazane polymer-containing composition is to be applied, the layers may be formed from the same or different compositions. For example, in one embodiment of the invention the first layer is formed from an organoborosilazane polymer solution, the second layer is formed from an organoborosilazane polymer solution containing a dispersed or solubilized Group IIa metal salt and a dispersed mixture of silicon metal and silicon hexaboride powders, the third layer is formed from an organoborosilazane polymer solution containing a dispersed or solubilized Group IIa metal salt, and a fourth layer is formed from an organoborosilazane solution containing a dispersed or solubilized Group IVa metal salt.

When temperatures as high as about 200°–250° C. are used to drive off high-boiling solvents, some pyrolysis of the preceramic material is initiated during the drying of the coating composition. However, higher temperatures, i.e., about 675°–925° C., preferably about 825°–875° C., are required to convert the preceramic coating to a ceramic coating. This pyrolysis may sometimes be delayed until the final thickness of preceramic organoborosilazane polymer-containing composition has been deposited, even when the coating is applied in multiple layers. However, when the coating is applied in multiple layers, it is generally to pyrolyze each one or two layers of dried preceramic coating and, if desired, also to sand the pyrolyzed layers to remove imperfections before applying the next layer of coating composition. The time required for the pyrolysis is generally about 1–60 minutes, depending on the particular pyrolysis temperature selected. In a preferred method of making the laminates of the invention where the coating is applied in multiple layers, each one or two of which is pyrolyzed before the application of the next layer, and the pyrolysis temperature is about 825°–875° C., it is generally preferred to pyrolyze the first coat for only about five minutes and then to pyrolyze subsequent coats for longer times up to about 15 minutes.

When the coating is intended to protect a substrate from oxidative deterioration at very high temperatures, e.g., temperatures higher than 800° C., the final pyrolysis is followed by thermal treatment of the coated substrate at about 1075°–1250°C., preferably about 1100°–1175° C., most preferably about 1125° C., in an atmosphere containing not more than a minor amount of oxygen, e.g., in a nitrogen, argon, or helium atmosphere, to convert the ceramic coating into a homogeneous film. This treatment may be accomplished by raising the temperature in the vessel used for the pyrolysis or by transferring the coated substrate to a vessel maintained at the higher temperature and it is preferably continued for at least about five minutes.

After the pyrolysis or pyrolysis/heat treatment employed in providing a ceramic coating, the coated substrate is cooled. Optimum results are attained when this cooling is accomplished at a rate not greater than about 50° C./minute, preferably about 20°–30° C./minute, until the substrate temperature is below 500° C., at which time further cooling may be accomplished at ambient air temperature.

Although not essential, it is preferred to keep the starting polysilazane and the organoborosilazane polymers and compositions formed from them in a dry atmosphere until a layer of ceramic has been formed because of the susceptibility of the preceramic materials to attack by water and other compounds having active hydrogens.

When the application, drying, and pyrolysis of the one or more layers of organoborosilazane polymer-containing composition have been completed, the buffer layer is applied and dried in essentially the same manner except that it is usually applied in a thinner layer, e.g., a layer having a thickness of about 0.5–5 micrometers. However, a thicker layer may also be useful. The buffer layer may be pyrolyzed before a top coat is applied, but pyrolysis at this time is not required.

The polysilazane-containing compositions which are applied over the buffer layer are solutions of 5–75% by weight of a polysilazane, such as those described above, in 95–25% b weight of an organic solvent, such as those mentioned above. As is the case with the organoborosilazane polymer-containing compositions, these compositions may also contain other ingredients, such as a Group IIa or IVa metal salt, an organometallic Grou IVa compound, a polycarbosilane and/or ceramic or preceramic powders. These optional ingredients, when employed, may be any of those exemplified above and are usually used in the same amounts as when included in the organoborosilazane polymer-containing compositions.

The application, drying, and pyrolysis of the one or more layers of polysilazane-containing composition are accomplished in the same manner as the application, drying, the pyrolysis of the one or more layers of polymer-containing composition, although even higher temperatures, e.g., about 1300°–1350° C., are apt to be found desirable for a final heat treatment after pyrolysis. As with the layers, multiple layers formed from a polysilazane-containing composition may be formed from the same or different compositions. For example, in one embodiment of the invention the first layer is formed from a polysilazane solution containing a dispersed or solubilized organometallic Group IVa compound, the second layer is formed from such a Group IVa compound-containing polysilazane solution which also contains a dispersed mixture of silicon metal, silicon tetraboride, and silicon hexaboride powders, and third and fourth layers are formed from a polysilazane solution containing no additives.

The invention is particularly advantageous in that the use of the buffer composition improves adhesion of polysilazane-derived ceramic layers to organoborosilazane ceramic layers, minimizes large-scale cracking when the former layers are applied over the latter, and permits the formation of multilayer ceramic coatings capable of providing outstanding resistance to oxidative deterioration at elevated temperatures and over a wide temperature range when applied to normally oxidizable materials. This advantage is of particular importance in the protection of carbon/carbon composites used in aerospace applications, such as engine components, advanced nozzle system components, and high-temperature vehicle structures.

The following examples are given to illustrate the invention and are not intended as a limitation thereof. Unless otherwise specified, quantities mentioned are quantities by weight.

EXAMPLE I

Synthesis of Polysilazane

Part A

A suitable reaction vessel was charged with 14L of anhydrous tetrahydrofuran and cooled to about 0° C., after which 1545g (13.43 mols) of methyldichlorosilane was added to the vessel, and stirring at about 60 rpm was begun. A slow steady stream of 1058g (62.12 mols) of anhydrous ammonia gas was introduced into the vessel at a flow rate such that the reaction pressure was maintained at or below 400 kPa, and the reaction temperature stayed in the range of 0°–10° C. Then the reaction mixture was stirred at 0° C. for about three hours, after which the coolant flow on the vessel was shut off, and the system was put room temperature and the majority of the excess ammonia to vent off. Then the reaction vessel was pressurized with sufficient nitrogen gas to pump the product mass through a bag filter assembly into a holding tank, where it was verified that the filtrate solution was free of particulates.

Part B

The clear filtrate from Part A was discharged into a polymerization vessel and chilled to about 0° C., and a suspension of 3.6g (0.089 mol) of potassium hydride powder in about 100 mL of anhydrous tetrahydrofuran was added to begin the polymerization reaction. The reaction mixture was maintained at 0° C. for about 8 hours and then allowed to warm gradually to about 22° C. After a total of about 26 hours of polymerization at 0°–22° C., the reaction was quenched by adding about 12.6g (0.13 mol) of dimethylchlorosilane to the polymerization solution.

The polymer product was isolated by (1) concentrating the product solution to about 4L of volume by vacuum distillation, (2) centrifuging the concentrated solution to obtain a clear supernatant solution and a white precipitate, (3) decanting off the supernatant solution from the precipitate, and (4) flashing off the volatiles from the supernatant solution by vacuum distillation to provide a white solid. Proton NMR spectra of the polymer in deuterated chloroform solvent had resonances consistent with those reported in Seyferth et al.-II for polysilazane and with the presence of a small amount, i.e., 2.4% by weight, of residual tetrahydrofuran.

EXAMPLE II

Synthesis of Organoborosilazane Polymers

Part A

An 86.4% solution of 3.3 parts of trimethoxyboroxine a 50/50 mixture of xylene and 1-methyl-2-pyrrolidone was slowly added with stirring to a 25% solution of one part of the pol silazane of Example I and 0.09 part of dimethylchlorosilane in a thermic reaction occurred to form a solution of an organoborosilazane polymer.

Part B

A 93.9% solution of four parts of trimethoxyboroxine 1-methyl-2-pyrrolidone was slowly added with stirring to a 25% solution of one part of the polysilazane of Example I and 0.09 part of dimethylchlorosilane in a 50/50 mixture of xylene 1-methyl-2-pyrrolidone. An exothermic reaction occurred to form a solution of an organoborosilane polymer which was diluted with an additional 0.07 part of 1-methyl-2-pyrrolidone.

EXAMPLE III

Synthesis of Ba-Containing Organoborosilazane Composition

A reaction mixture was prepared by adding 100 parts the organoborosilazane polymer solution of Example II, Part A, to five parts of barium fluoride. The mixture was then gently heated to 90° C. and allowed to react for about six hours.

EXAMPLE IV

Synthesis of Zr-Containing Organoborosilazane Composition

Five parts of bis(cyclopentadienyl)zirconium dichloride was dispersed in 100 parts of, the organoborosilazane polymer solution of Example II, Part A, and the resulting composition was stirred continuously while being heated overnight at 110° C. to dissolve a portion of the zirconium compound.

EXAMPLE V

Synthesis of Zr-Containing Polysilazane Composition

One part of bis(cyclopentadienyl)zirconium dichloride was dispersed in a 30% solution of 30 parts of the polysilazane of Example I in xylene, and the resulting composition was stirred continuously while being heated overnight at about 100° C. to dissolve the major portion of the zirconium compound. The remaining solids were removed by filtration.

EXAMPLE VI

Preparation of Dispersions

Part A

One part of amorphous silicon metal powder and one part of silicon hexaboride powder were dispersed in an amount of the product of Example II containing 0.5 part of barium fluoride to form Dispersion A.

Part B

One part of amorphous silicon metal, one part of silicon hexaboride, 0.5 part of silicon tetraboride, and one part of aluminum-silicon eutectic were dispersed in an amount of the product of Example IV containing 0.5 part of bis(cyclopentadienyl)zirconium dichloride to form Dispersion B.

Part C

One part of amorphous silicon metal, one part of silicon tetraboride, and 0.5 part of silicon hexaboride were dispersed in an amount of the product of Example V containing 0.5 part of bis(cyclopentadienyl)zirconium dichloride to form Dispersion C.

Part D

One part of amorphous silicon metal, one part of silicon tetraboride, and 0.5 part of silicon hexaboride were dispersed in a xylene solution of 100 parts of the polysilazane of Example I to form Dispersion D.

Part E

One part of amorphous silicon metal, one part of silicon hexaboride, and 0.5 part of barium fluoride were dispersed in an amount of the organoborosilazane polymer product solution of Example II, Part B, prepared from 100 parts of the polysilazane to form Dispersion E.

EXAMPLE VII

Preparation of Buffer Layer Compositions

Part A

Buffer composition A was prepared by dissolving 25 parts of aluminum sec-butoxide, 25 parts of zirconium propoxide, one part of bis(cyclopentadienyl)zirconium dichloride, 5 parts of tetrakis(diethylamino)titanium, and 25 parts of tetrakis(dimethylamino)silane in 19 parts of xylene.

Part B

Buffer composition B was prepared by dispersing a 3/1 mixture of amorphous silicon metal powder and silicon powder in the solution of Part A in an amount such as to provide a dispersion having a dispersed solids content of 20-25%.

Part C

Buffer composition C was prepared by dissolving 25 parts of zirconium propoxide, 25 parts of aluminum sec-butoxide, and 12.5 parts of tetrakis(diethylamino)-titanium in 62.5 parts of a 40% solution of the polysilazane of Example I in xylene.

Part D

Buffer composition D was prepared by dispersing a 3/1 mixture of amorphous silicon metal powder and silicon tetraborid powder in the solution of Part C in an amount such as to provide a dispersion having a dispersed solids content of 20-25%.

EXAMPLE VIII

Inhibited carbon-carbon composite coupons (i.e., carbon/carbon composite coupons containing an oxidation inhibitor) having nominal dimensions of about 2.5 cm×2.5 cm×0.34 cm were abraded to provide a smooth finish, cleaned, vacuum dried, and coated with a primer composition obtained by mixing 3-5 cc of a 1.9 M solution of HF in ethanol, 3 cc of xylene, and 3 cc of isopropanol with 100g of trimethoxyboroxine. The primer coating was solidified, and the primed surfaces were then successively coated with (1) the organoborosilazane polymer solution of Example II, Part A, (2) Dispersion A, (3) the Ba-containing organoborosilazane composition of Example III, and (4) Dispersion B, each of which coating layers was dried and pyrolyzed before the application of the next layer.

After Dispersion B had been dried and pyrolyzed, it was overcoated with Buffer composition A, which was then dried and zane composition of Example IV, (2) Dispersion C, (3) a solution of the polysilazane of Example I, and (4) another layer of a solution of the polysilazane of Example I, each of which coating layers was dried and pyrolyzed before the application of the next layer, to complete the formation of a multilayer coating having a thickness of about 760 micrometers on the coupons. The layers applied over the buffer layer had good adherence to the lower layers and had few-to-no cracks.

The effectiveness of the coating in protecting the substrate from oxidative deterioration at elevated temperatures and deterioration by exposure to moisture was determined by subjecting some of the coated coupons to four 6-minute exposures at about 1426° C., eight 30-minute exposures at about 815° C., and one 18-hour exposure at about 648° C. and placing them in a humidity chamber maintained at 98% relative humidity at a temperature of 40° C. for 24 hours after each thermal cycle. After three thermal cycles and two humidity cycles, the coated coupons were determined to have suffered a weight loss of only 1.02%.

The remaining coupons were subjected to a more stringent thermal cycle of 24 minutes at about 1426° C., four hours at about 815° C., and 18 hours at about 648° C, then placed in the humidity chamber for 24 hours, and finally heated at about 815° C. for four hours. Even under these more stringent conditions, the weight loss determined at the end of the test was only 8.98%.

EXAMPLE IX

Example VIII was essentially repeated except that the, coating compositions successively applied to the primed substrate were (1) the organoborosilazane polymer solution of Example II, Part B, (2) Dispersion E, (3) Buffer composition D overcoated with a solution of the polysilazane of Example I, (4) Dispersion D, and (5) a solution of the polysilazane of Example I; and the more stringent test was the only one to which the coated coupons were subjected. As in Example VIII, the layers applied over the buffer layer had good adherence to the lower layers and had few-to-no cracks. The weight loss at the end of the test was only 2.95%.

It is obvious that many variations may be made in the products and processes set forth above without departing from the spirit and scope of this invention.

What is claimed is:

1. A composition comprising a solution of (A) a Group IIIb metal hydrocarbyloxide, (B) a Group IVa metal hydrocarbyloxide, (C) a bis-, tris-, or tetrakis(-dialkylamino)metal of Group IVa, (D) a polysilazane and/or a bis-, tris-, or tetrakis(dialkylamino)silane, and (E) optionally also a cyclopentadienyl Group IVa metal halide in an organic solvent; each of ingredients A-D constituting 1-50% of their combined weights, and the amount ingredient E employed being such that it constitutes 0-20% of the combined weights of the ingredients.

2. The composition of claim 1 wherein the hydrocarbyloxides are alkoxides in which the alkoxy groups contain 1-6 carbons.

3. The composition of claim 2 wherein the alkoxides are aluminum sec-butoxide and zirconium propoxide.

4. The composition of claim 1 wherein the cyclopentadienyl Group IVa metal halide is a compound corresponding to the formula $(C_5H_5)_n MH_m X_p$ in which M is a group IVa metal; X is halo; m is 0, 1, or 2; p and n are integers of 1-3; and the sum of m, n, and p is 4.

5. The composition of claim 4 wherein the cyclopentadienyl Group IVa metal halide is bis(cyclopentadienyl)zirconium dichloride.

6. The composition of claim 1 wherein the (dialkylamino)metal is a compound in which the alkyl groups contain 1-6

7. The composition of claim 6 wherein the (dialkylamino)metal is tetrakis(diethylamino)titanium.

8. The composition of claim 1 wherein the is a polymer prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

9. The composition of claim 8 wherein the organodihalosilane is methyldichlorosilane and the basic catalyst is potassium hydride.

10. The composition of claim 1 wherein the (dialkylamino)silane is a compound in which the alkyl groups contain 1-6 carbons.

11. The composition of claim 10 wherein the (dialkylamino)silane is tetrakis(dimethylamino)silane.

12. The composition of claim 1 containing 20-30% by weight of the Group IIIb metal hydrocarbyloxide, 20-30% by weight of the Group IVa metal hydrocarbyloxide, 20-30% by weight of the polysilazane and/or bis-, tris-, or tetrakis(dialkylamino)silane, and 1-15% by weight of the bis-, tris-, or tetrakis(dialkylamino)metal of Group IVa, and 0-5% by weight of the cyclopentad Group IVa metal halide.

13. A composition comprising the solution of claim 1 having 15-30% by weight of ceramic or preceramic powdered solids dispersed therein.

14. The composition of claim 13 wherein the powdered solids are a mixture of silicon metal and silicon tetraboride 15. The composition of claim 14 comprising a dispersion of a 3/1 mixture of silicon metal and silicon tetraboride in an organic solvent solution containing 20-30% by weight of aluminum sec-butoxide, 20-30% by weight of zirconium propoxide, 0-5% by weight of bis(cyclopentadienyl)zirconium dichloride, 1-15% by weight of tetrakis(diethylamino)titanium, and 20-30% by weight of (1) a polysilazane prepared by reacting methyldichlor silane with ammonia, treating the ammonolysis product with potassium hydride, and quenching the resultant product with an electrophilic quenching reagent and/or (2) tetrakis(dimethylamino)silane; said powders constituting 15-30% of the weight of the dispersion.

* * * * *